United States Patent [19]

Zacharias

[11] Patent Number: 4,939,989
[45] Date of Patent: Jul. 10, 1990

[54] TREE LIMB FOLDING AND TYING APPARATUS

[76] Inventor: Donald Zacharias, R.D. #2, Box 151, Weatherly, Pa. 18255

[21] Appl. No.: 318,112

[22] Filed: Mar. 2, 1989

[51] Int. Cl.$^5$ .......................................... B65B 13/10
[52] U.S. Cl. ...................................... 100/13; 47/1.01; 53/588; 100/27
[58] Field of Search ....................... 100/3, 5, 8, 13, 16, 100/25, 26, 27; 47/1.01, 4, 58; 53/528, 529, 530, 588, 439, 589

[56] References Cited

U.S. PATENT DOCUMENTS

| 221,972 | 11/1879 | Murray | 47/1.01 |
|---|---|---|---|
| 988,347 | 4/1911 | Johnson | 100/13 |
| 1,877,548 | 9/1932 | Brimer | 100/27 |
| 2,482,392 | 9/1949 | Whitaker | 47/1.01 |
| 2,581,479 | 1/1952 | Grasham | 47/1.01 |
| 2,792,775 | 5/1957 | Beyette | 100/13 |
| 2,797,634 | 7/1957 | Rueckert | 100/13 |
| 2,966,111 | 12/1960 | Yafjack | 100/13 |
| 2,974,457 | 3/1961 | Saxton | 100/13 |
| 3,015,187 | 1/1962 | Grether | 47/1.01 |
| 3,445,985 | 5/1969 | Manetta | 53/530 |
| 3,747,293 | 7/1973 | Van Slooten et al. | 53/439 |
| 4,619,193 | 10/1986 | Crew | 100/13 |
| 4,628,671 | 12/1986 | Storm et al. | 53/588 |

Primary Examiner—Harvey C. Hornsby
Assistant Examiner—Stephen F. Gerrity
Attorney, Agent, or Firm—Fleit, Jacobson, Cohn, Price, Holman & Stern

[57] ABSTRACT

A horizontal annular frame is provided for support immediately adjacent, but outwardly of, one side of a land vehicle with the frame mounted from a support adjustably vertically shiftable relative to the land vehicle. The frame is selectively openable to define a horizontal passageway thereinto to enable the frame to be horizontally advanced into position about a tree trunk below the branches thereof and the frame is closable after disposition about a tree trunk. When the frame is closed, it defines a circular track upon which a mount for a string canister is guidingly supported for powered movement about the track and inner peripheral portions of the frame include circumferentially spaced horizontal rollers for engaging and upwardly deflecting the limbs of a tree as the frame is elevated about the tree and the string canister is powered about the frame for spirally baling the tree limbs in their upwardly deflected positions.

13 Claims, 4 Drawing Sheets

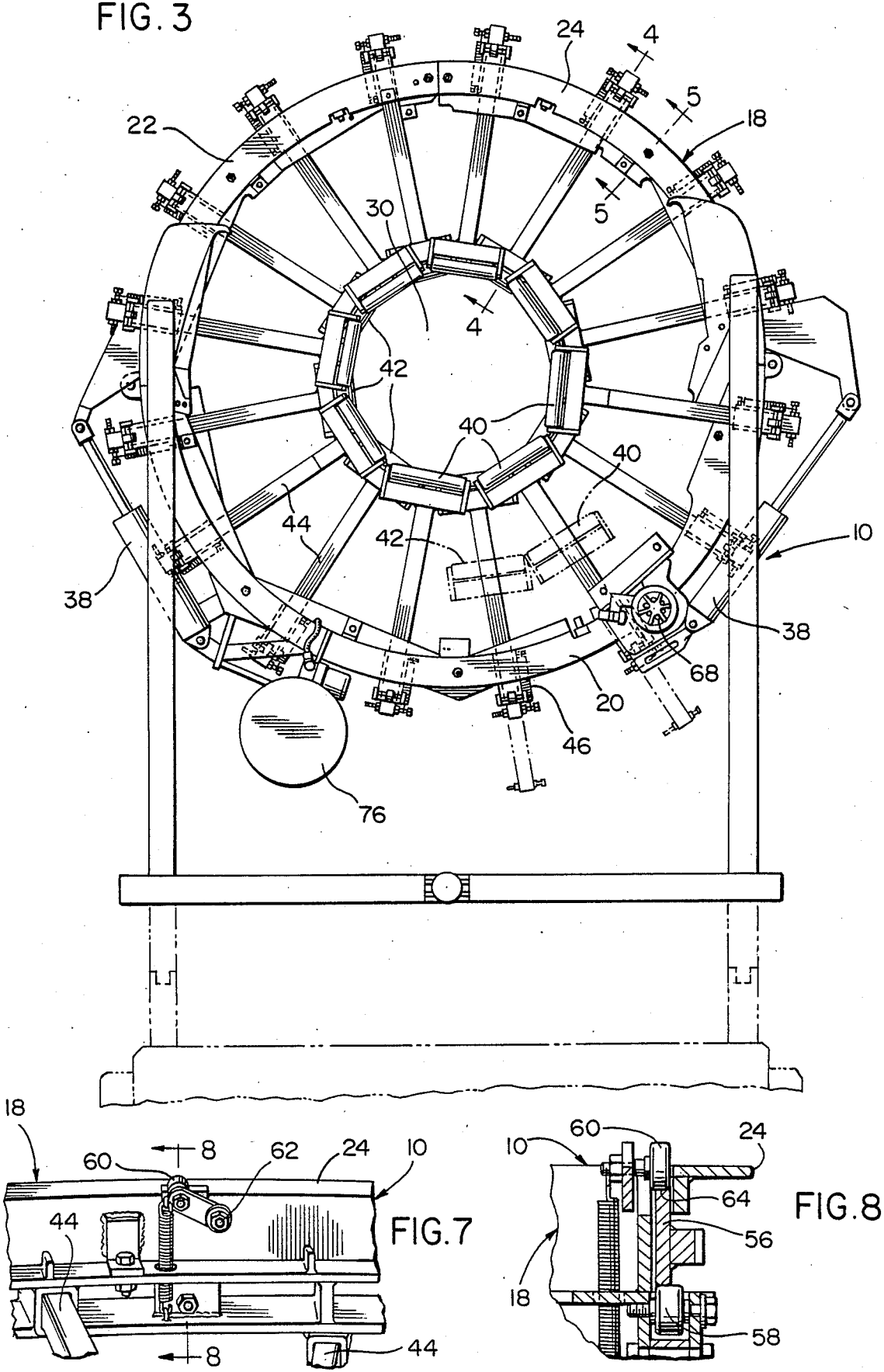

TREE LIMB FOLDING AND TYING APPARATUS

BACKGROUND OF THE INVENTION

1. Field of the Invention

This invention relates to an apparatus for spirally baling a tree with its limbs in upwardly deflected positions closely adjacent the tree trunk, the tree then being more readily accessible for cutting the tree from the lower extremity of the trunk thereof or being more readily approached by a tree digging apparatus for removal of the tree from the ground with its root system intact and without damage to the tree limbs.

2. Description of Related Art

Various different forms of tree baling and other similar devices including some of the general structural and operational features of the instant invention are disclosed in U.S. Pat. Nos. 1,877,548, 2,797,634, 2,974,457, 3,445,985, 4,619,193 and 4,628,671. However, these previously known devices do not include the overall structural and operational features of the instant invention which together function to enable a standing ground rooted tree to be efficiently baled with its limbs in upwardly deflected positions closely adjacent the tree trunk, with little or no damage to the upwardly deflected limbs and through the use of an apparatus able to be maneuvered through a crowded tree farm area. Also, the structural and operational features of the instant invention are such to provide a standing tree baler which may occupy a smaller plan area than other known forms of tree balers capable of baling the same maximum size tree with the same maximum limb spread. Actually, the apparatus of the instant invention may be engaged about and function to bale a standing tree having a branch spread plan area greater than the plan area of the tree baling apparatus.

SUMMARY OF THE INVENTION

The tree limb folding and tying (baling) apparatus of the instant invention defines horizontal collar or frame structure which is selectively openable to define a horizontal passageway thereinto in order to enable the collar or frame to be horizontally moved into position about a tree trunk below the branches thereof and the collar then may be closed to fully encircle the tree trunk after being positioned thereabout. The collar or annular frame includes upper and lower sets of horizontal rollers spaced peripherally about the frame or collar and guidingly supported therefrom for shifting generally radially of the frame between inward limit positions disposed about and closely spaced outward of a central area of the frame to receive a tree trunk upwardly therethrough and outward limit positions spaced outward of the inward limit positions. Each roller is disposed generally normal to the path of guided shifting thereof and has biasing means opertively associated therewith for biasing the roller toward its inward limit position. Further, the upper and lower rollers are alternately spaced about the frame with adjacent ends of peripherally adjacent rollers being vertically end overlapped when the peripherally adjacent rollers are in their inward limit positions.

The main object of this invention is to provide a tree limb folding and tree baling apparatus which will be capable of upwardly deflecting the limbs of a tree while simultaneously spirally baling the tree limbs without damage thereto.

Another object of this invention is to provide an apparatus in accordance with the preceding object and which is capable of being horizontally engaged about an associated tree as opposed to being initially engaged with a tree to be baled by lowering the apparatus downwardly over the tree to be baled.

Yet another object of this invention is to provide a tree baling apparatus capable of baling a tree whose limb span covers a plan area greater than the plan area of the tree baling apparatus.

Still another object of this invention is to provide a tree baling apparatus which may be more readily moved about a crowded tree farm area because of a reduced plan area occupied by the tree baling apparatus.

A still further object of this invention is to provide a tree baling apparatus including limb engaging and folding structure specifically designed to enable the limbs of various trees to be upwardly folded thereby with minimal limb damage.

A final object of this invention to be specifically enumerated herein is to provide a tree baling apparatus in accordance with the preceding objects and which will comform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a further top plan view of the tree tying apparatus illustrated in FIG. 1 but with the annular frame thereof in a closed position, outwardly retracted positions of two peripherally adjacent limb folding rollers of the apparatus being illustrated in phantom lines;

FIG. 7 is a fragmentary perspective view illustrating a detent mechanism for engagement with an associated arcuate rack or ring gear section to retain the latter in predetermined position relative to the support structure therefor;

FIG. 8 is an enlarged vertical sectional view taken substantially upon the plane indicated by the section line 8—8 of FIG. 7;

DESCRIPTION OF THE PREFERRED EMBODIMENTS

Figure 1:
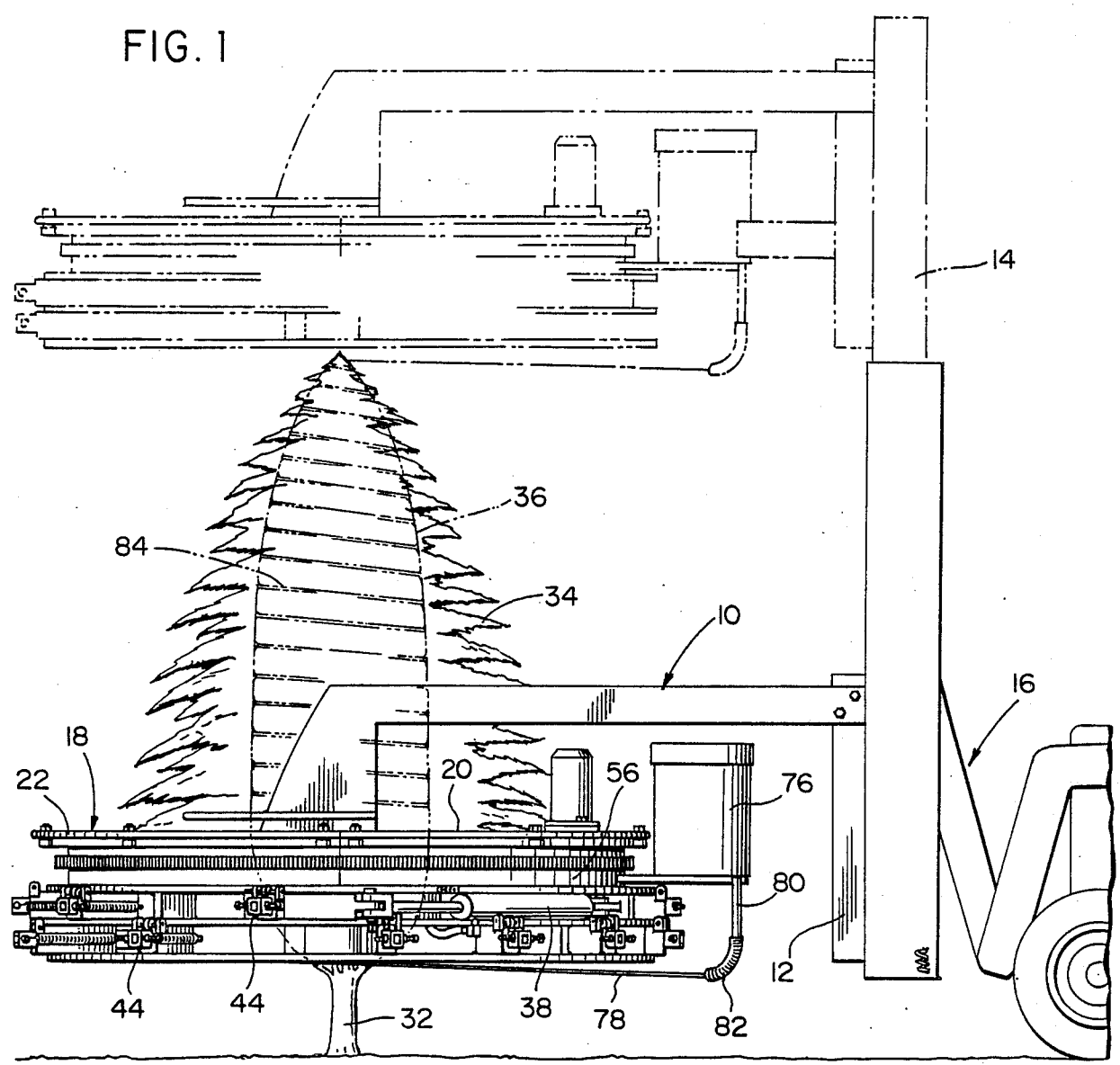
FIG. 1 is a side elevational view of the tree limb folding and tying apparatus of the instant invention operatively associated with a standing tree and an upper position of the tree tying apparatus and the tree in baled condition illustrated in phantom lines.

Referring now more specifically to FIGS. 1–9, a first form of tree limb folding and tying (baling) apparatus is referred to in general by the reference numeral 10. The apparatus includes a base structure 12 mounted from an elevatable support 14 comprising the elevatable portion of a lift truck referred to in general by the reference numeral 16.

Figure 2:
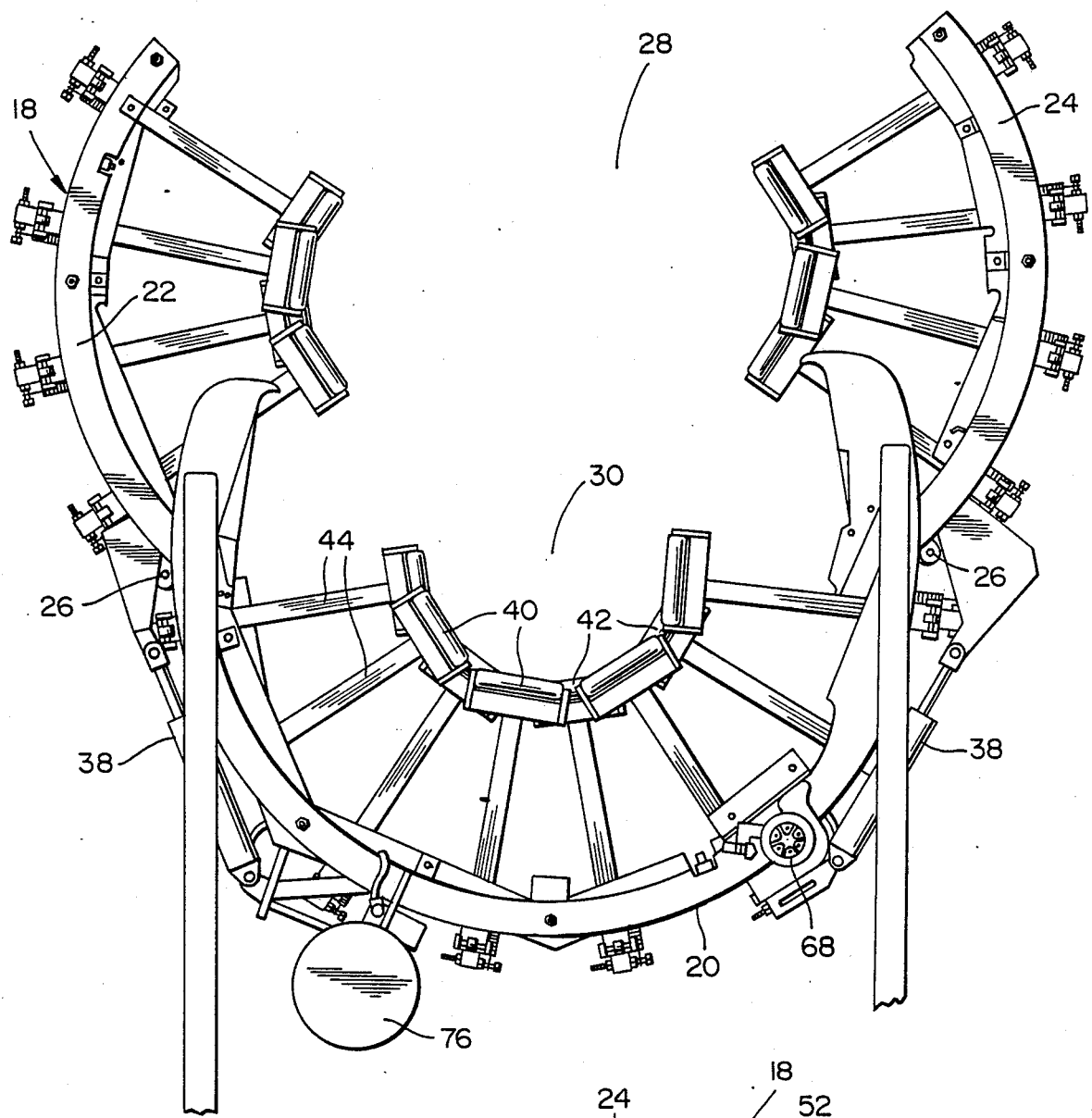
FIG. 2 is a slightly enlarged top plan view of the tree tying apparatus illustrated in FIG. 1 with a pair of arcuate frame sections of the tree tying apparatus illustrated in their open positions to enable the tree tying apparatus to be horizontally engaged about the trunk of a standing tree.

A generally annular horizontal frame or collar referred to in general by the reference numeral 18 is supported from the base structure 12 and includes a first stationary arcuate section (FIG. 2) of generally 180° in angular extent and second and third arcuate sections 22 and 24 of generally 90° in angular extent and including corresponding ends pivotally supported from the opposite ends of the section 20 as at 26 for horizontal swinging of the sections 22 and 24 relative to the section 20 between the open limit positions of the sections 22 and 24 illustrated in FIG. 2 and closed positions of the sections 22 and 24 illustrated in FIG. 3. As may be seen from FIG. 3, when the sections 22 and 24 are in their closed positions, the frame 18 is substantially peripherally continuous. However, as may be seen from FIG. 2, when the sections 22 and 24 are in their open positions, a horizontal passageway 28 is defined into the central area 30 of the frame 18 to thereby enable the frame 18 to be horizontally advanced into position about the trunk 32 of a tree 34 to be spirally baled in the manner shown at 36 in FIG. 1.

Hydraulic cylinders 38 are operably connected between the arcuate section 20 and the arcuate sections 22 and 24 for swinging the sections 22 and 24 between the open and closed positions thereof illustrated in FIGS. 2 and 3.

Figure 4:
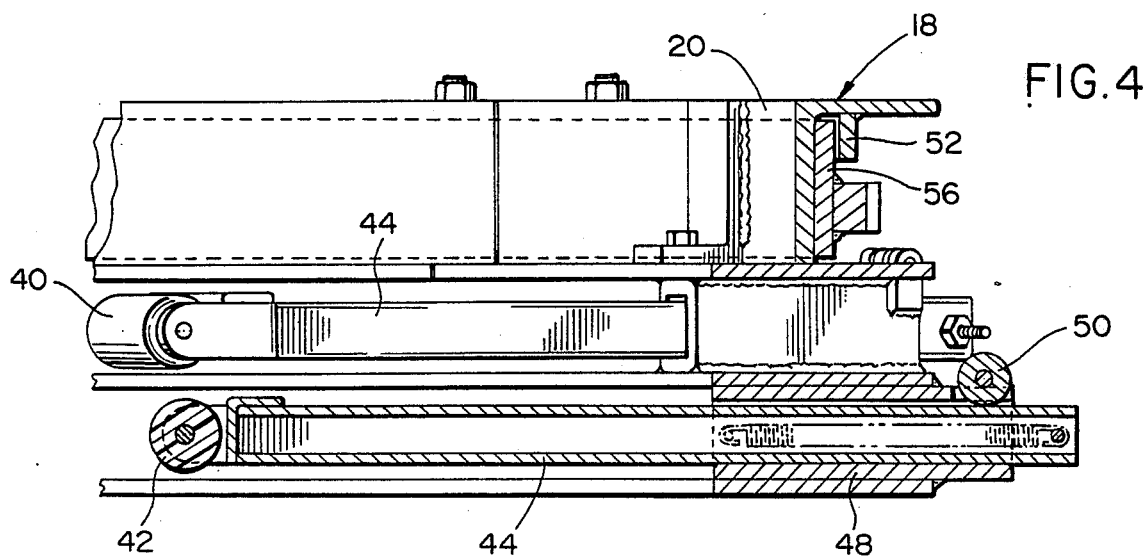
FIG. 4 is an enlarged fragmentary vertical sectional view taken substantially upon the plane indicated by the section line 4—4 of FIG. 3.

With attention now invited more specifically to FIGS. 2, 3 and 4, it may be seen that the annular frame 18 includes upper and lower sets of rollers 40 and 42. The rollers 40 and 42 are spaced alternately about the frame 18 with each of the arcuate sections 20, 22 and 24 supporting both upper and lower rollers 40 and 42 therefrom. Each roller 40 and 42 is mounted from a corresponding roller support arm 44 and the support arms 44 are each guidingly supported from the corresponding frame section for rectalinear movement relative thereto and with the support arms 44 extending generally radially of the frame 18. Each support arm includes an expansion spring operatively connected between the support arm 44 and the corresponding frame section, the expansion springs 46 yieldingly biasing the support arms 44 toward their innermost limit positions illustrated in solid lines in FIG. 3. The rollers 40 and 42 each are disposed generally normal to the corresponding support arm with a central longitudinal vertical plane of each support arm 44 passing through the corresponding roller 40 or 42 substantially centrally intermediate the opposite ends thereof.

From FIG. 3 of the drawings it may be seen that peripherally adjacent rollers 40 and 42 enjoy end overlapped adjacent ends when the support arms 44 and rollers 40 and 42 are disposed in their innermost positions. Further, as may be seen from the phantom line positions of peripherally adjacent rollers 40 and 42 illustrated in FIG. 3, when the rollers 40 and 42 are in their outermost limit positions adjacent rollers 40 and 42 have adjacent ends thereof substantially vertically registered with each other.

It may be seen from FIG. 4 that the support arms 44 are received through guide sleeves 48 carried by the corresponding frame section and that the outer ends of the guide sleeves 48 include guide rollers 50 journalled therefrom which rollingly engage the upper surface of the support arms 44. In addition, the radial innermost ends of the sleeves 48 may be provided with rollers corresponding to the rollers 50, but rollingly engaged with the under surfaces of the support arms 44.

Figure 5:
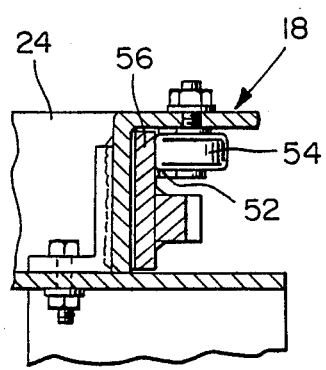
FIG. 5 is an enlarged fragmentary vertical sectional view taken substantially upon the plane indicated by the section line 5—5 of FIG. 3.
Figure 6:
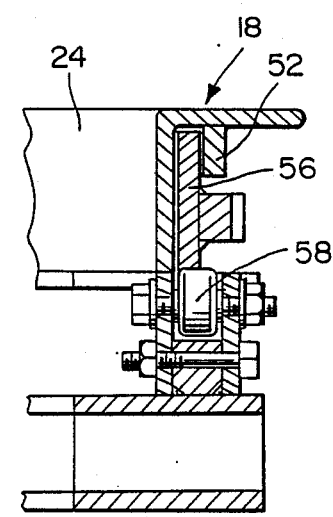
FIG. 6 is a fragmentary vertical sectional view similar to FIG. 5 but illustrating a support roller for engagement with the lower edge of one of the arcuate rack or ring gear sections of the apparatus.
Figure 9:
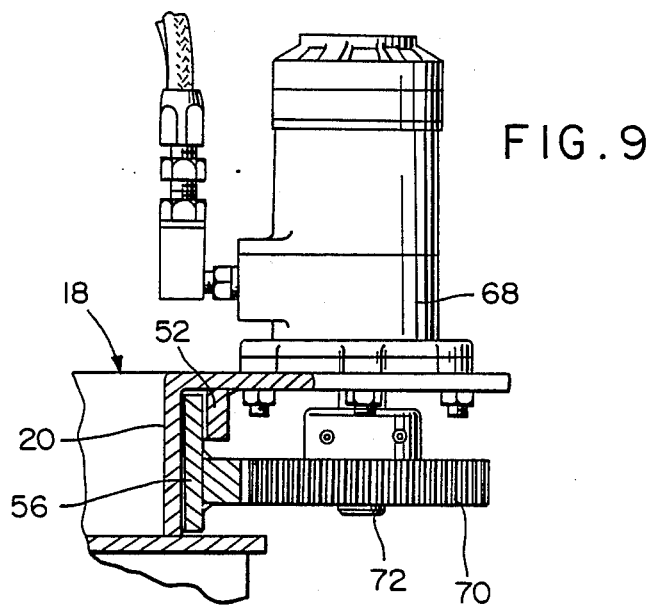
FIG. 9 is a fragmentary vertical sectional view illustrating the hydraulic drive motor for the ring gear.

Each of the annular sections 20, 22 and 24 includes a plurality of peripherally spaced ring or rack gear section retaining flanges 52 supported therefrom, see FIG. 4, having spaced adjacent ends and each arcuate section further includes peripherally spaced horizontal rollers 54 journalled therefrom, see FIG. 5, in the spacing between adjacent retaining flange ends. In addition, each of the arcuate sections 20, 22 and 24 has an arcuate ring or rack gear section 56 supported therefrom of equal angular extent and each section 56 is held captive behind the flanges 52 and rollers 54, adjacent ends of the sections 56 being substantially abutted against each other when the sections 22 and 24 are in the closed positions thereof illustrated in FIG. 3. Furthermore, each of the sections 20, 22 and 24 includes a plurality of support rollers 58 journalled therefrom and spaced thereabout over which the undersurfaces of the ring gear or rack gear sections 56 are rollingly supported, see FIG. 6. Finally, with attention invited more specifically to FIGS. 7 and 8, at least the arcuate sections 20 and 24 each include spring biased detent rollers 60 swingably supported therefrom as at 62, each roller 60 being downwardly engageable in an upwardly opening notch 64 formed in the corresponding ring or rack gear section 56, the coacting rollers 60 and notches 64 defining detents for retaining the ring or rack gear sections 56 in predetermined positions centered relative to the arcuate sections 20, 22 and 24 of the frame 18 when the sections 22 and 24 are in the open positions thereof illustrated in FIG. 2.

Supported from the arcuate section 20 of the annular frame 18 is a hydraulic motor 68 having a spur gear 70 mounted on its output shaft 72 and the spur gear 70 is mesh engaged with the ring or rack gear section 56 on the arcuate section 20. Upon operation of the motor 68, the ring or rack gear sections 56 move about the sections 20, 22 and 24 when the sections 22 and 24 are closed with the leading end of each rack gear section 56 abutted against the trailing end of the rack gear section 56 disposed forwardly thereof. Of course, the diameter of the spur gear 70 is sufficient whereby it may readily change from being mesh engaged with one rack gear section 56 to the trailing rack gear section 56 as the rack gear sections 56 move about the frame 18.

When the rack gear section 56 of 180° in angular extent is centered on the 180° arcuate section 20 of the frame 18 (in the "home" position thereof), all of the rollers 60 are seated in the corresponding notches 54. When a suitable control switch (not shown) is opened, the next time the 180° gear section 56 is in the "home" position thereof operation of the hydraulic motor 68 is terminated automatically by a "home" position sensing switch (not shown) operatively associated with the 180° gear section 56. Thus, all of the rack gear sections 56 will be properly centered relative to their corresponding arcuate frame sections 20, 22 and 24 and the hydraulic cylinders 38 may be actuated to open the arcuate sections 22 and 24.

The rack gear section 56 of 180° in angular extent supports a baling or tying string canister 76 therefrom, see FIGS. 1, 2 and 3 and a length of tie string 78 extends from a string outlet tube 80 of the canister 76 and passes through a tension maintaining coil spring 82 supported on the free end of the tube 80, the extended end of the tie string 78 being anchorable to the trunk or a lower limb of the tree 34. Of course, as the ring or rack gear sections 56 move about the frame 18 under the driving action of the hydraulic motor 68, the string canister 76 also moves about the frame 18. Thus, it may be seen that when the rack gear sections 56 are being driven about the frame 18 and the latter is being elevated relative to the tree 34, the tie string 78 will be helically wound about the tree 34 as at 84.

In operation, and assuming that the arcuate sections 22 and 24 are in the open positions thereof illustrated in FIG. 2, the lift truck 16 is moved into position so that the trunk 32 of the tree 34 is received through the passageway 28 and substantially centered in the central area 30, see FIG. 2. Thereafter, the hydraulic cylinders 38 are actuated to close the sections 22 and 24. Then, the lift truck 16 is utilized to slowly elevate the apparatus 10 from the lowered solid line position thereof illustrated in FIG. 1 toward the upper phantom line position thereof illustrated in FIG. 1 after the tie string 78 has been anchored relative to the tree trunk or a lower limb of the tree 34 and the control for the hydraulic motor 68 has been actuated to cause operation of the motor 68. Then, as the frame 18 is elevated and the rack gear section 56 from which the canister 76 is supported moves about the frame 18, the tree 34 is spirally wrapped or baled as at 84 with the tie string 78.

As the frame 18 is elevated from the lowered position thereof illustrated in FIG. 1, the rollers 40 and 42 engage and upwardly fold the limbs of the tree into positions closely adjacent the tree trunk 32 such that the tree is spirally baled as at 36, see FIG. 1. As soon as the tie string 78 has reached the top of the tree 34, the control for the motor 68 is opened and the hydraulic motor will continue to operate until the 180° gear section 56 reaches its "home" position and all of the rollers 60 are seated in the corresponding notches 64, thereby indexing the ring gear sections 56 centrally with respect to the corresponding arcuate sections 20, 22 and 24. Thereafter, the tie string 78 may be cut and tied at the top of the tree 34 and the lift truck 16 may be maneuvered toward the next tree to be spirally baled as the base structure 12 is lowered to the low position thereof illustrated in FIG. 1 and the arcuate sections 22 and 24 are swung to the open positions thereof illustrated in FIG. 2. Therefore, by the time the lift truck 16 approaches the next tree to be baled, the apparatus 10 may be operatively engaged therewith and the tree baling operation on the next tree may be repeated.

From FIG. 3 of the drawings it will be noted that the rollers 40 and 42 extend continuously about the area 30 in which the tree 34 is centered during the baling operation, even when the rollers 40 and 42 are in their outermost limit positions. Of course, as the tree limbs are upwardly folded toward the tree trunk 32, some of the support arms 44 may retract outwardly relative to the frame 10 against the biasing action of the corresponding springs 46. In this manner, all of the limbs of the tree 34 may be at least reasonably tightly upwardly folded toward the trunk 32 of the tree 34 during the spiral baling process.

Figure 11:
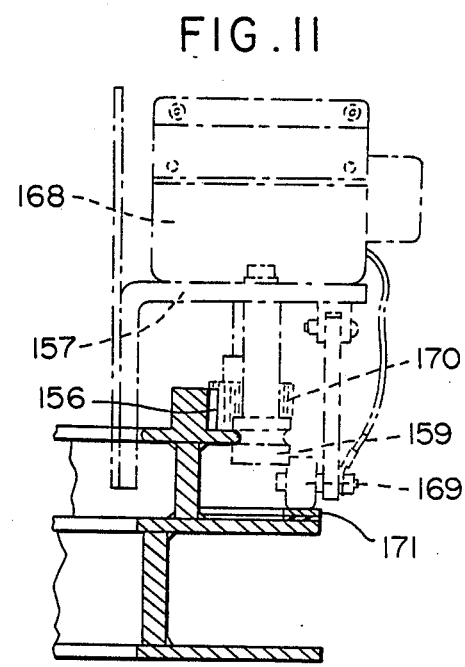
FIG. 11 is an enlarged fragmentary vertical sectional view illustrating the electric motor drive of the embodiment illustrated in FIG. 10.
Figure 10:
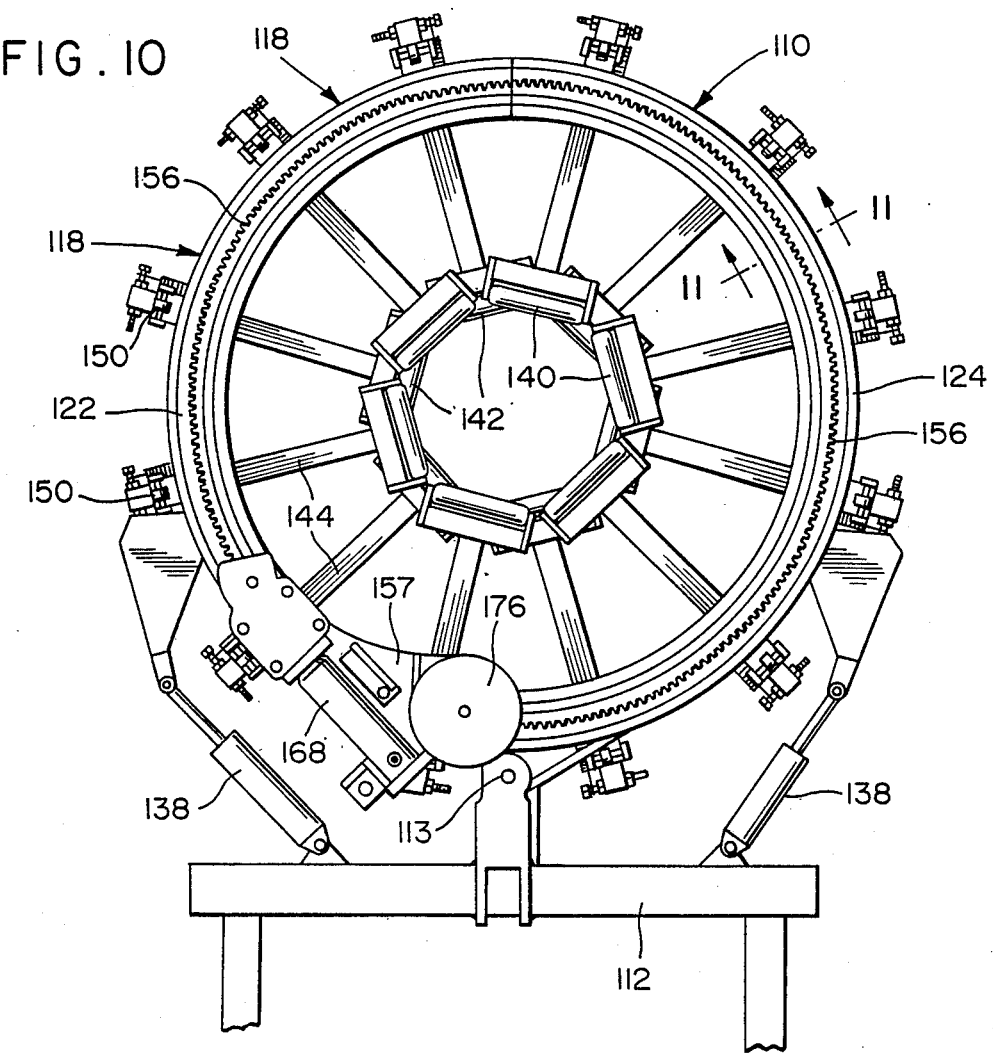
FIG. 10 is a top plan view of a modified form of tree limb folding a tying apparatus utilizing a pair of relatively pivotable arcuate frame sections of substantially 180° in angular extent as opposed to one stationary arcuate frame section of 180° in angular extent and a pair of relatively pivotable arcuate frame sections of substantially 90° in angular extent, such as the frame sections utilized in the embodiment illustrated in FIGS. 1–9.

With attention now invited more specifically to FIGS. 10 and 11, a modified form of tree limb folding and tying apparatus is referred to in general by the reference numeral 110. The basic structure of the apparatus 110 is substantially identical to the apparatus 10, except that the apparatus 110 includes only one pair of arcuate sections 122 and 124 of substantially 180° in angular extent and relatively swingably supported from the base structure 112 corresponding to the base structure 12 as at 113. In addition, each of the frame sections 122 and 124 includes a stationary rack gear section 156 supported therefrom and a carriage 157 is mounted from the frame 118 comprising the arcuate sections 122 and 124 for movement thereabout by a plurality of guide rollers 159, the carriage 157 supporting a string canister 176 therefrom corresponding to the canister 76. The carriage 157 supports an electric motor 168 therefrom having a rotary torque output spur gear 170 mesh engaged with the rack gear sections 156 mounted stationary relative to the arcuate sections 122 and 124. The electric motor 168 includes an electrical potential pickup wheel 16 rollingly engaged with electrified and insulatively supported arcuate track sections 171 carried by and extending about the arcuate sections 122 and 124, the electric motor 168 being grounded to the sections 122 and 124 through the guide rollers 159. It will of course be appreciated that the electric motor 168 comprises a low voltage motor.

Accordingly, the apparatus 110 functions in substantially the same manner as the apparatus 10 in that as the frame 118 of the apparatus 110 is elevated and the rollers 140 and 142 thereof upwardly deflect associated tree limbs the string canister 176 is driven about the annular frame 118 and string dispensed from the string canister 176 spirally wraps or bales the associated tree.

It will be noted that the apparatus 110 includes hydraulic cylinders 138 corresponding to the hydraulic cylinders 38 and support arms 144 corresponding to the support arms 44 with whose upper surfaces guide rollers 150 corresponding to the rollers 50 are rollingly engaged.

However, it will be appreciated that the apparatus 110 does not require the equivalent of the retaining flanges 52, the rollers 54 or the rollers 58. Further, the apparatus 110 further does not require the rollers 60 or the coacting notches 64. However, if it is desired, the ends of the 90° ring or rack gear sections 56 adjacent the ends of the 180° ring or rack gear section 56 may be coupled thereto through the utilization of relatively short flexible strap members extending between the opposite ends of the 180° rack gear 56 and the adjacent ends of the 90° rack gear sections 56.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A tree limb folding apparatus including base means for support from an elevatable support, a generally annular horizontal frame mounted from said support for elevational shifting therewith and defining a central area therewithin in which to receive a lower trunk portion of a tree, said frame including at least two peripherally adjacent arcuate frame sections shiftable relative to each other and said support for movement between closed positions closing said annular frame and open positions with adjacent ends of said adjacent arcuate frame sections displaced apart and defining a passageway between said adjacent ends through which to receive the lower trunk portion of a tree into said central area of said annular frame upon horizontal advancement of said open frame toward said tree, said peripherally adjacent frame sections each including upper and lower sets of horizontal rollers, for engaging and folding tree limbs, supported from the corresponding frame section for guided shifting generally radially of the corresponding frame section between inward limit positions disposed about and defining said central area when said shiftable frame sections are in the closed positions thereof and outward limit positions spaced outward of said inward limit positions, each of said rollers being disposed generally normal to the path of guided shifting thereof relative to the corresponding frame section, biasing means yieldingly biasing said rollers toward their inward limit positions, the upper and lower rollers of each arcuate frame section being alternately spaced thereabout with adjacent ends of peripherally adjacent rollers of each frame section being end overlapped when said peripherally adjacent rollers are in said inward limit positions thereof.

2. The apparatus of claim 1 wherein said annular frame includes flexible tension member dispensing structure supported therefrom for guided and powered movement about said frame when said frame sections are in said closed positions.

3. The apparatus of claim 2 wherein said tension member dispensing structure includes a motor driven spur gear journalled from one of said frame sections, said frame sections including arcuate rack gear sections guidingly supported therefrom for movement about said frame and defining a substantially continuous ring gear when said frame sections are in the closed positions thereof, said spur gear being mesh engaged with said ring gear for driving said ring gear about said frame sections, a tension member canister mounted on one of said rack gear sections for movement about said frame with said rack gear sections.

4. The apparatus of claim 1 including force developing means operatively connected between said support and said shiftable frame sections for selectively shifting said shiftable frame sections between their open and closed positions.

5. The apparatus of claim 1 wherein said shiftable frame sections equal two in number and each frame section is generally 180° in angular extent.

6. The apparatus of claim 1 wherein said annular frame includes a first arcuate frame section of generally 180° in angular extent stationarily supported from said support and second and third arcuate frame sections each of generally 90° in angular extent having corresponding ends pivotally supported from the opposite ends of said first frame section.

7. A tree limb folding and tying apparatus including base means for support from an elevatable support, a generally annular horizontal frame mounted from said support for elevational shifting therewith and defining a central area therewithin in which to receive a lower trunk portion of a tree, said frame including at least two peripherally adjacent arcuate frame sections relatively shiftable to each other and said support for movement between closed positions defining a substantially closed generally annular frame and open positions with adjacent ends of said adjacent arcuate frame sections displaced apart and defining a passageway therebetween through which to receive the lower trunk portion of said tree into said central area of said annular frame, said adjacent arcuate frame sections each including means for engaging and upwardly deflecting limbs of a tree centered within said frame as said frame is elevated relative to said tree with said support, said annular frame including flexible tension member dispensing structure mounted thereon for guided powered movement about said frame when said frame sections are in said closed positions to dispense a flexible tension member around said tree for baling said tree.

8. The apparatus of claim 7 wherein said tension member dispensing structure includes a motor driven spur gear journalled from one of said frame sections, said frame sections including arcuate rack gear sections supported therefrom defining a substantially continuous ring gear when said frame sections are in the closed positions thereof, said spur gear being mesh engaged with said ring gear for driving said ring gear about said frame sections, a tension member canister mounted on one of said rack gear sections for movement about said frame with said rack gear sections.

9. The apparatus of claim 7 including force developing means operatively connected between said support and said shiftable frame sections for selectively shifting said shiftable frame sections between their open and closed positions.

10. The apparatus of claim 7 wherein said shiftable frame sections equal two in number and each frame section is generally 180° in angular extent.

11. The apparatus of claim 7 wherein said annular frame includes a first arcuate frame section of generally 180° in angular extent stationarily supported from said support and second and third arcuate frame sections each of generally 90° in angular extent having corresponding ends pivotally supported from the opposite ends of said first frame section.

12. An apparatus for spirally baling a tree with its limbs in upwardly deflected positions closely adjacent the trunk of the tree, said apparatus including horizontal generally annular collar means selectively openable to define a horizontal passageway thereinto so as to enable said collar means to be horizontally shifted into position about a tree trunk below the branches thereof and closable about said tree trunk whereby the collar means may fully encircle said trunk, said collar means including upper and lower sets of horizontal rollers, for engaging and folding tree limbs supported therefrom for guided shifting generally radially of said collar means between inwardly limit positions disposed about and defining a central area of said collar means and outward limit positions spaced outward of said inward positions, said collar means being mounted from an elevatable support, each of said rollers being disposed generally normal to the path of guided shifting thereof relative to said collar means, biasing means yieldingly biasing said rollers toward their inward limit positions, said collar means including flexible tension member dispensing structure supported therefrom for guided powered movement about said collar means when said collar means is in said closed position.

13. The apparatus of claim 12 wherein said upper and lower rollers of said collar means are alternately spaced thereabout with adjacent ends of peripherally adjacent rollers of said collar means being end overlapped when said peripherally adjacent rollers are in the inward limit positions thereof.

* * * * *